Nov. 5, 1940.  B. C. PLACE  2,220,827
SECURING MOLDINGS
Filed July 11, 1938  2 Sheets-Sheet 1
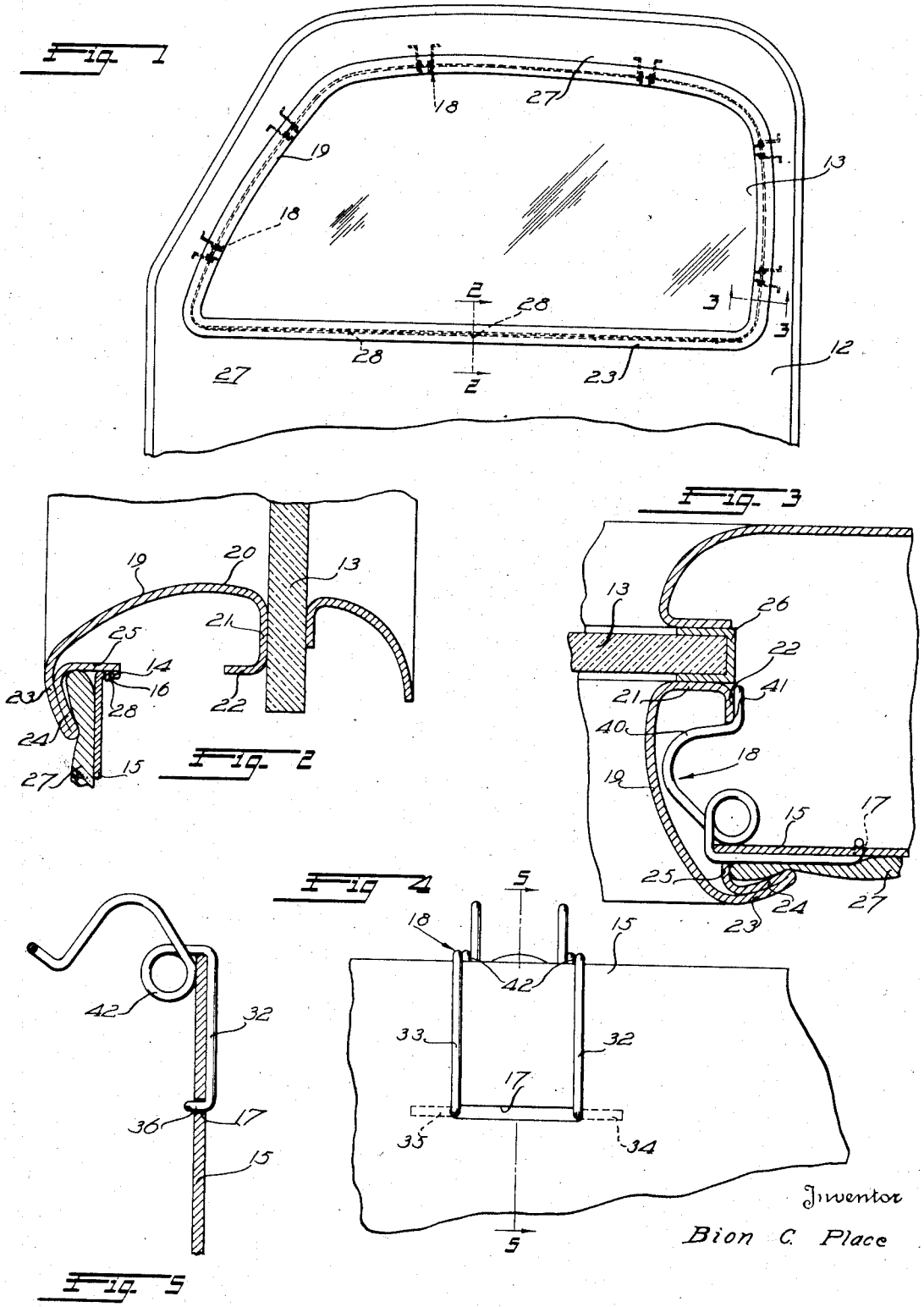
Inventor
Bion C. Place
By Strauch & Hoffman
Attorneys

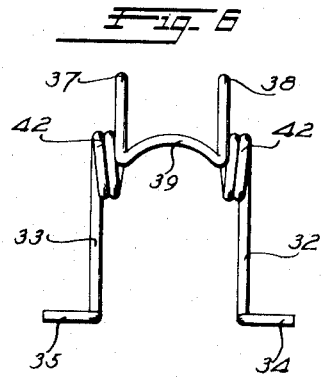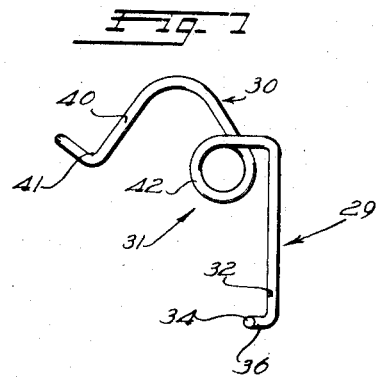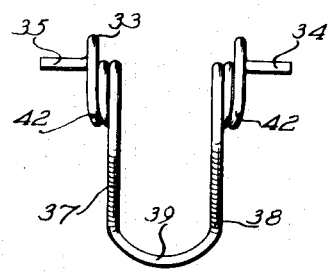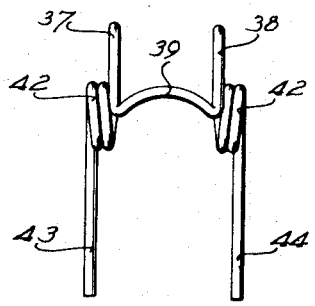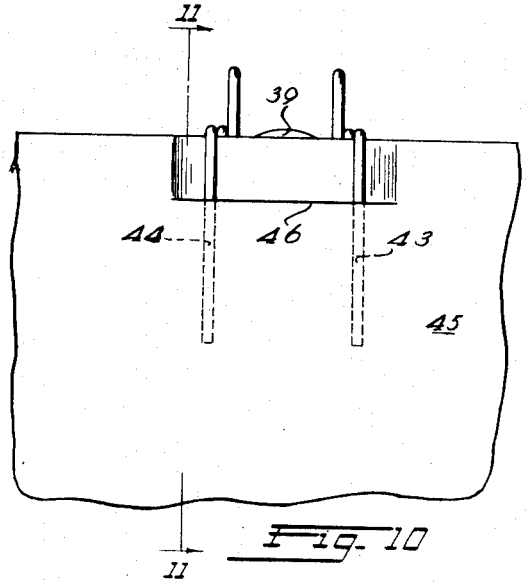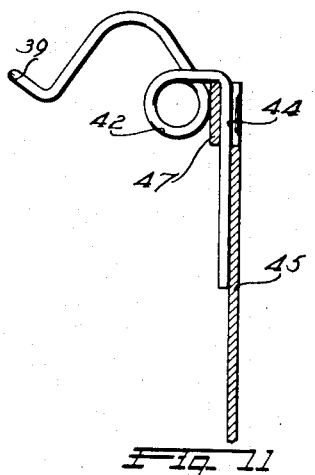

Patented Nov. 5, 1940

2,220,827

UNITED STATES PATENT OFFICE 2,220,827

SECURING MOLDINGS

Bion C. Place, Detroit, Mich., assignor of one-half to George E. Gagnier, Detroit, Mich.

Application July 11, 1938, Serial No. 218,675

11 Claims. (Cl. 296—44)

The present invention is concerned with the securing of hollow moldings, such as garnish moldings of the type utilized to retain windows or panels in openings in automobile or like constructions, the molding serving to provide a finished appearance to the frame surrounding the window opening. More particularly, the present invention is concerned with an improved fastener, preferably constructed from wire, so as to be readily applied to the window frame and to permit the molding to be snapped into engagement with a multiplicity of the fasteners regardless of the exact fit of the molding in the window frame and regardless of such slight variations in the form of the molding as actually occur in practice.

The primary purpose of the present invention is to provide an improved spring fastener, consisting in an attaching part formed for convenient interlocking with a frame, a holding part provided with an inclined shoulder shaped to wedge a molding or the like engaged therewith into contact with a window or like panel, and a part connecting the attaching and holding parts, the connecting part including a springy portion that renders the holding part sufficiently resilient to permit retraction of the fasteners in the application of the molding and to then cause the holding parts to exert firm holding pressure maintaining the molding in position.

A further object of the invention is to provide an improved window construction, including a garnish molding in the form of a closed figure, in which the molding is held in position and centered in the opening regardless of manufacturing variations in the dimensions of the molding by spring fasteners formed so as to permit the molding to be simply inserted in the window opening in the frame and held in position by fasteners that snap into engagement with a portion of the molding and thus prevent withdrawal thereof from said opening.

A still further object of the invention is to provide an improved window frame construction having fasteners of novel form associated therewith in a novel manner so that the fasteners themselves provide the sole means on three sides of the window opening to engage and retain the garnish molding that holds the window in place and serves to finish the sides of the frame opening.

A still further object of the invention is to provide a spring fastener for use in securing hollow moldings in place, which may be constructed at low cost from a single piece of wire, a portion of the wire providing the holding part of the fastener, another portion the part to attach the fastener to the frame, and a third part to provide a yielding connection between the holding and retaining parts.

Still further objects of the invention will appear as the description thereof proceeds in connection with the accompanying drawings in which:

Figure 1 is a fragmentary elevational view of a portion of an automobile door illustrating a window held in the door frame in accordance with the present invention;

Figure 2 is a fragmentary sectional view on an enlarged scale taken on the plane indicated by the line 2—2 in Figure 1.

Figure 3 is a sectional view on an enlarged scale taken on the plane indicated by the line 3—3 in Figure 1 looking in the direction of the arrows.

Figure 4 is a fragmentary view showing how one of the fasteners constituting a part of the present invention is interlocked with respect to said part.

Figure 5 is a sectional view taken on the plane indicated by the line 5—5 in Figure 4 looking in the direction of the arrows.

Figures 6, 7 and 8 are respectively side, edge and plan views of the preferred form of fastener constituting an important part of the present invention.

Figure 9 is a view corresponding to Figure 6 but showing a modified form of fastener.

Figure 10 is a fragmentary elevational view showing how the fastener of Figure 9 is interlocked with respect to the frame.

Figure 11 is a sectional view taken on the plane indicated by the line 11—11 in Figure 10 looking in the direction of the arrows.

Like reference characters indicate like parts throughout the several figures.

Referring to Figures 1, 2 and 3 of the drawings, 12 indicates a door frame, such as that of an automobile, for example, having a window 13 mounted in an opening therein. Door frame 12 includes an inwardly turned flange 14 at one side, that is, the bottom of the opening of the window opening. On the other three sides of the window opening a wall 15, disposed in a plane parallel to the plane of the window 13, is provided. Flange 14 is provided with one or more openings 16, Figure 2, presently to be referred to. The wall 15, at the points at which fasteners are to be secured thereto, is provided with a multiplicity of elongated slots 17, Figure 4. A multiplicity of fasteners, each indicated as a whole by 18 are interlocked to the wall 15 of the door frame at intervals around the three sides of the door openings, as indicated in Figure 1, in a manner presently to be described. These fasteners retain a garnish molding 19 that laps the window in position in the opening in the door frame as illustrated.

Garnish molding 19 is constructed in the form of an open figure fitting approximately within the opening in the door frame. The garnish molding is preferably constructed from sheet metal properly finished, and is of substantially the same cross section at every point of its periphery. Said molding comprises a curved body portion 20, a downwardly turned flange 21 at one edge, said flange terminating in a further inwardly turned flange 22 in approximate parallelism with the body portion 20. The other edge of the body portion 20 is turned downwardly providing a straight skirt portion 23, which supports a further return bent skirt portion 24 from which an inwardly extending flange 25 extends toward the flange 22. Preferably the flanges 25 and 22 are disposed in the same plane, but having their edges in substantial spaced relation as illustrated. The portion 21 of the hollow garnish molding just described is intended to bear against the window 13 at the bottom of the opening, and the corresponding portion 21 at the other three sides of the opening may bear against a packing 26 disposed around the edge of the window pane 13. The skirt portion 23 laps the portion of the frame that provides the opening and preferably laps the door finish panel 27, which extends to the window opening and is secured to the door frame in any approved manner. Said skirt portion thus provides a finished appearance where the trim material terminates at the window opening, and at the same time conceals any clearance that may exist between the garnished molding frame and the door frame opening, it being difficult in actual practice to so construct the garnish molding frame that a close fit is presented between the edges of the door opening and the molding fitting therein. The skirt portion 23 makes an accurate fit unnecessary. The mode of securing the garnish molding in the door frame opening, presently to be described, and constituting the present invention, likewise does not require that the garnish molding accurately fit within the opening provided to receive it. It is sufficient if it approximately does so.

The garnish molding at the lower edge thereof is provided with one or more depending projections 28, two of which are illustrated in Figure 1, which enter the openings 16 provided in the inwardly turned flange 14 surrounding the window opening in the door frame. The projections 28 may consist in studs welded or otherwise secured to the portion 25 of the molding, or they may constitute tongues struck from the metal constituting said portion. The garnish molding is secured at the lower side thereof by simply entering the projections 28 in the opening 16, tilting the molding frame in order that this may be accomplished, the molding being then snapped into position by moving the upper portion thereof into the opening, the fasteners 18 presently to be described snapping into the space between the portions 22 and 25 of the hollow garnish molding.

Before the garnish molding is applied to the opening, the required number of fasteners illustrated in Figures 6, 7 and 8 are interlocked with respect to the wall 15. The fasteners are preferably constructed each from a single piece of wire bent into the desired form, and, preferably, then properly tempered to provide the fastener with the proper degree of resilience and stiffness. Each fastener comprises an attaching part 29, a holding part 30, the attaching and holding parts being connected together by a connecting part 31, constructed to give the fastener the necessary resilience and stiffness.

The attaching part of the fastener comprises two arms 32 and 33 carrying respectively laterally extending portions 34 and 35 offset from the arms 32 by portions 36. Preferably the attaching part of the fastener is constructed from the two ends of the piece of wire from which the fastener is made, as illustrated in the drawings. The holding part of the fastener is preferably constructed from the mid-portion of said piece of wire, by bending it into U-shaped formation so as to provide two laterally spaced arms 37 and 38 connected together by a portion 39. Each of the arms 37 and 38 is curved so as to provide an inclined holding shoulder 40. The portion of each arm adjacent the connecting portion 39 preferably is relatively straight constituting a stop, the purpose of which will presently be stated.

The connecting portion 31 preferably consists in one or more convolutions or coils located adjacent the approximate right angle formed between the attaching portion 29 and the holding portion 30 in the preferred embodiment of the invention, said convolutions or coils being formed by properly bending the portion of the wire that serves to connect the attaching and holding parts of the fastener.

The mode of attachment of the fasteners to the wall 15 will be clear from Figures 4 and 5 of the drawings. In applying the fasteners at properly spaced intervals to the wall surrounding the window opening, the fastener is laterally contracted by moving the arms 32 and 33 of the attaching part of the fastener towards each other to permit the laterally extending portions 34 and 35 to be passed through the slot 17 in the wall 15. After these portions have been passed through the slot, the fastener is permitted to expand towards its original position, bringing the connecting portions 36 into firm contact with the end walls of the slot 17 and the laterally projecting portions 34 and 35 in position lapping the side of the wall 15 opposite from that engaged by the arms 32 and 33. Prior to moving the arms 32 and 33 of the attaching part of the fastener towards each other, the coils 42 are preferably hooked on the top edge of the wall 15 so that, when the arms 32 and 33 are permitted to spring apart, the fastener will be firmly secured in the position illustrated in Figures 4 and 5 with the holding part 30 extending approximately at right angles to the wall 15 and the connecting part 31 disposed immediately adjacent the wall 15 at the upper edge thereof.

It will be understood that the fasteners are all applied to the frame adjacent the opening in the manner just described and that the garnish molding is then applied to the frame by first engaging the projections 28 with the openings 16, the molding being tilted to permit this to be done. The molding is thus supported upon the flange 14 and secured in position with respect thereto, and it is then turned to bring the fasteners in engagement therewith. In moving the molding into the opening it will be understood that the flange 22 engages the outer rounded portion of the arms 37 and 38 causing the fasteners to be moved out of the path of the molding.

After the latter has reached the final position, the said arms swing outward under the action of the resilient connecting part bringing the rounded inner portion of the arms 37 and 38 in engagement with the edge of the flange 22 of the molding. The extent of springing movement of the fastener is limited by the stop 41. It will be understood that as the rounded inner portion of the arms 37 and 38 constituting the holding part of the fastener move into the hollow molding that a wedging action is exerted forcing the molding firmly against the window. The fasteners may be constructed of sufficiently stiff material and are intended to be so designed to cause the molding to bear against the window.

It will be appreciated that it is unnecessary that the molding fit accurately in the opening in which it is secured, inasmuch as the holding parts of the fasteners are designed to project into the opening and will be compressed to a greater or less extent depending upon the exact size of the molding though of course the moldings are intended to be of the same size. Experience has shown, however, that it is impractical to construct them all of the same form and size, and that variations in form and dimensions do occur in actual practice. These are compensated for in the design of the fastener already described.

In the modification of the invention illustrated in Figure 9 of the drawings, the attaching part of the fastener consists simply of two straight arms 43 and 44. In other respects the fastener illustrated in this figure is exactly the same as that already described and like reference characters are applied to corresponding parts thereof.

The fastener of Figure 9 may be used as illustrated in Figures 10 and 11, in which the wall 45 surrounding the opening is provided with a slit 46 and the metal separated from the body of the wall by said slit is offset out of the plane of the wall as indicated at 47, permitting the arms 43 and 44 to be passed between said outset portion 47 and a side of the wall 45 as clearly illustrated in these figures.

The molding is applied to the opening in the frame 45, when a fastener such as illustrated in Figures 9, 10 and 11 are used, in the manner already described with respect to the preferred form of the invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A spring fastener, consisting in an attaching part, a holding part and a resilient part connecting said attaching and holding parts, said holding part extending laterally of said attaching part and comprising a curved portion ending in a straight portion providing a rounded shoulder and a stop, and said attaching part comprising straight portions arranged in offset right angular relation to each other.

2. A spring fastener constructed from a single piece of wire consisting in a holding part in the form of a curved U-shaped portion including the mid-portion of said piece of wire, an attaching part including the wire ends and comprising two spaced arms having laterally extending offset portions, and a connecting part comprising a pair of coils joining the holding part and the attaching part.

3. A window construction, comprising a frame having an opening, a window in said opening, a hollow molding retaining said window in the frame, and a multiplicity of spring fasteners fixedly interlocked to a vertical wall of said frame and protruding into said opening to retain the molding in position therein, said fasteners each including a coil spring urging the holding part of the fastener into resilient engagement with a shoulder on the inside of said molding.

4. The construction defined in claim 3 in which each of said fasteners includes a holding shoulder that is inclined in a direction so that its coil spring is effective through said shoulder to yieldingly urge said molding into firm contact with the window.

5. A vehicle or like window construction, comprising a frame having an opening, a window in said opening, a hollow molding abutting against said window, said molding being supported along one of its sides on said frame and on all of its other sides entirely by spring fasteners, said fasteners being immovably secured to a vertical wall of said frame and bearing yieldably against an internal shoulder of said molding at said other sides, said fasteners holding the molding from endwise movement and from lateral movement away from said first named side.

6. A vehicle or like window construction, comprising a frame having an opening, a window in said opening, a hollow molding abutting against said window, said molding being supported along one of its sides on said frame and on all of its other sides entirely by resilient portions of spring fasteners being fixedly attached to said frame and that protrude in said opening, said fasteners having shoulders inclined with respect to the plane of said window and bearing against a cooperating internal shoulder on said molding whereby said molding is urged against said window by said fasteners at said other sides.

7. A window frame ready for the application of a hollow garnish molding in the form of a closed figure comprising a flange along the bottom of the window opening to support the molding, a wall paralleling the plane of the opening at the top and sides of the opening, and a plurality of fasteners in engagement with said wall at said top and sides of the opening, said fasteners each having an attaching part fixedly interlocked to said wall, a holding part having shoulders inclined with respect to said plane and extending laterally of said attaching part and a connecting part resiliently uniting said attaching and holding parts.

8. The combination defined in claim 7 in which said fasteners are each constructed from a single piece of wire and in which the attaching part consists in the end portions of the piece of wire and the holding and connecting parts comprise intermediate portions of the piece.

9. A vehicle or the like window construction comprising a frame having an opening, a window in said opening, a hollow molding abutting against said window, said molding being supported along one of its sides on said frame, spring fasteners having parts immovably attached to said frame at all of the other sides of said molding and having holding parts resiliently connected to said first named parts and protruding into the opening so as to yield toward and away from said molding, said holding parts having shoulders inclined with respect to the plane of said opening and engaging said molding and supporting and holding it from endwise movement and from lateral movement away from said side, said shoulders being long and extending in a direction toward the frame and toward the window.

10. A vehicle or like window construction, comprising a frame having an opening, a window in said opening, a hollow molding abutting against said window, said molding being supported along one of its sides on said frame, spring fasteners having parts immovably attached to said frame at all of the other sides of said molding and having holding parts resiliently connected to said first named parts and protruding into the opening so as to yield toward and away from said molding, said holding parts being shaped to provide long shoulders inclined with respect to the plane of said window and extending in a direction toward the frame and toward the window, said shoulders engaging said molding and supporting and holding it from endwise movement and from lateral movement away from said side.

11. A one-piece wire spring fastener, consisting in an attaching part, a holding part extending laterally of said attaching part and a resilient part connecting said attaching and holding parts, said attaching part comprising a pair of spaced wire arms disposed in the same plane, said arms being formed from the ends of the piece of wire and each including an offset laterally extending portion, said holding part consisting in two further spaced wire arms bent to each provide an inclined holding shoulder, and said resilient part comprising a pair of wire coils, each of said coils consisting in at least one complete convolution.

BION C. PLACE.

CERTIFICATE OF CORRECTION.

Patent No. 2,220,827. November 5, 1940.

BION C. PLACE.

It is hereby certified that error appears in the printed specification of the above numbered patent requiring correction as follows: Page 3, second column, line 42, claim 6, strike out the words "that protrude in said opening, said fasteners" and insert the same before "being" in line 41, same claim; and that the said Letters Patent should be read with this correction therein that the same may conform to the record of the case in the Patent Office.

Signed and sealed this 21st day of January, A. D. 1941.

(Seal)

Henry Van Arsdale,
Acting Commissioner of Patents.